United States Patent [19]

Elkins

[11] Patent Number: 4,495,735
[45] Date of Patent: Jan. 29, 1985

[54] UNITARY RACK WITH LATCH MEANS

[76] Inventor: Johnny C. Elkins, P.O. Box 2599, San Angelo, Tex. 76902

[21] Appl. No.: 529,138

[22] Filed: Sep. 2, 1983

Related U.S. Application Data

[63] Continuation-in-part of Ser. No. 244,219, Mar. 16, 1981, Pat. No. 4,402,164.

[51] Int. Cl.³ .............................................. A47F 5/08
[52] U.S. Cl. ........................................ 52/27; 211/87; 224/42.45 A
[58] Field of Search ................. 52/27, 173 R; 211/87, 211/64; 224/42.45 R, 42.45 A; 296/84 A, 97 C; 49/460; 160/178 R; 248/208

[56] References Cited

U.S. PATENT DOCUMENTS

| | | | |
|---|---|---|---|
| 2,157,001 | 5/1939 | Morley | 224/42.45 A |
| 2,474,513 | 6/1949 | Behrens | 248/208 |
| 2,542,369 | 2/1951 | Steendahl | 224/42.45 A |
| 2,557,537 | 6/1951 | Ellison | 224/42.45 A |
| 2,687,836 | 8/1954 | Rhodes et al. | 224/42.45 R |
| 2,747,781 | 5/1956 | Schofield | 224/42.45 A |
| 3,009,214 | 11/1961 | Thompson | 49/460 |
| 3,352,428 | 11/1967 | Sak et al. | 211/87 |
| 4,058,221 | 11/1977 | Elkins et al. | 211/87 |
| 4,108,313 | 8/1978 | Bogar | 211/87 X |
| 4,402,164 | 9/1983 | Elkins | 52/27 |

FOREIGN PATENT DOCUMENTS

| | | | |
|---|---|---|---|
| 902828 | 8/1962 | United Kingdom | 52/27 |
| 2043004 | 10/1980 | United Kingdom | 224/42.45 R |

*Primary Examiner*—J. Karl Bell
*Attorney, Agent, or Firm*—Marcus L. Bates

[57] ABSTRACT

A unitary metal rack having a latch means formed thereon. The rack provides a hanger for articles, and is supported from a frame and gasket assembly, as for example, a truck rear window having a frame, gasket, and glass, wherein the glass is held within the frame by the gasket, and the gasket contacts the marginal edges of the glass and the marginal edges of the frame. The rack includes a bent-up main body having a flat side which bears against a vertical wall of the frame. A hook forms the lower end of the main body. A lip forms the upper edge portion of the main body and extends in opposition to the hook. The upper marginal end of the main body is forced between the gasket and the frame wall, with the lip thereof being positioned in abutting relationship respective to an edge formed at the upper end of the frame wall. A marginal flat side of the main body is placed in contact with the frame wall. Various different objects, including clothes and the like, can be supported by the hook. The rack can be removed by prying the lip away from the frame wall and removing the upper marginal end of the main body from between the gasket and frame wall.

10 Claims, 7 Drawing Figures

UNITARY RACK WITH LATCH MEANS

RELATED PATENTS

This patent application is a continuation-in-part of my co-pending U.S. patent application Ser. No. 244,219, "UNITARY RACK WITH LATCH MEANS" filed Mar. 16, 1981 now U.S. Pat. No. 4,402,164 on Sept. 6, 1983.

BACKGROUND OF THE INVENTION

It is old in the art to employ a window gasket for mounting a rack inside a vehicle, as evidenced by my prior U.S. Pat. Nos. 3,876,079 issued April 8, 1975; 3,931,893 issued Jan. 13, 1976; and 4,058,221 issued Nov. 15, 1977. Reference is made to these previous patents and to my co-pending U.S. Pat. No. 4,402,164 as well as the art cited therein for further background of the invention.

As pointed out in my previous U.S. Pat. No. 4,402,164, it is convenient to be able to employ a rack in a vehicle for hanging various different objects in areas which otherwise have no provisions or appurtenances for this convenience. For example, the fixed rear window of a pickup truck offers a vast amount of readily accessible adjacent area which is commodious and usually not used for storage. Moreover, the roll-up windows of the rear seat area of a vehicle provides a vast amount of unused area most of the time, and it would be convenient to be able to employ a rack in combination with a roll-up window so that articles can be stored in this unused commodious area also. Furthermore, the passenger side of the vehicle offers an abundance of room which can be advantageously utilized if one has means by which a rack device can be included in proximity of the roll-up window on the passenger side.

It is not always convenient to utilize the upper edge of a window for a rack, and in these instances it would be advantageous to instead install a rack between the window frame and gasket therefor, as for example, at the lower end of the window, wherein the metal frame and gasket is used for support, rather than the window frame and gasket, as taught in my co-pending patent.

Moreover, it would be advantageous to have a rugged rack made from a single piece of bent-up metal which could be installed immediately below a window glass, thereby not obscuring one's view through the window.

A rack which achieves the above desirable goal is the subject of the present invention.

SUMMARY OF THE INVENTION

A rack in combination with a window frame and gasket, wherein the window frame has an upper marginal edge portion encapsulated by the lower marginal edge portion of the gasket. The gasket usually abuts a terminal end of the glass and also covers a marginal edge portion of the glass. The rack of the present invention includes a hook attached to a lower end of a main body with the hook extending away therefrom.

A flat side of the main body abuttingly engages the side of the window frame which underlies the gasket. The main body has an upper marginal edge which terminates in a lip, with the lip extending laterally at an acute angle from the flat side of the main body in opposition to the hook.

The lip forms a latch means which engages an upper edge of the main frame. The gasket restrains the rack from movement away from the edge of the main frame. The flat upper marginal edge portion of the main body is forced under the gasket until the lip of the rack is received beyond the upper edge of the window frame so that the lip is brought to bear against the edge of the main frame and the flat side of the main body is brought to bear against a marginal area of one vertical side of the window frame, so that the upper marginal end of the main body is captured between the gasket and window frame. The rack can be removed by inserting a flat implement, such as a screw driver or rule, between the vertical main frame wall and the flat of the main body, thereby releasing the lip from the edge of the main frame so that the upper marginal end of the main body can be withdrawn from the sandwiched relationship respective to the gasket and the window frame.

In one embodiment of the invention, the lower marginal terminal edge portion of the main frame is bent into the form of an upwardly opening hook. Several spaced apart racks can be mounted in side by side relationship in the above described manner so that all sorts of different things can be carried in supported relationship therewith, including coat hangers, coats, caps, hats, purses, diamond necklaces, rubber bands, and the like.

Accordingly, a primary object of the present invention is the provision of a rack apparatus which includes a latch means thereon by which the rack is releasably attached to a fixed window frame of a vehicle.

Another object of the present invention is the provision of a rack apparatus which includes a latch means thereon by which the rack is releasably attached to the upper edge portion of a roll-up window of a vehicle.

Still another object of the present invention is the provision of a rack in combination with a window frame and gasket.

Another and still further object of the present invention is the provision of an improved rack for use in conjunction with a window frame and gasket therefor which includes a latch means by which an upper edge of the window frame supports the rack.

An additional object of the present invention is the provision of a unitary rack which can be removably affixed to a window frame by a latch device so that a rack can be attached to a window frame and gasket and thereby support various different elements therefrom.

These and various other objects and advantages of the invention will become readily apparent to those skilled in the art upon reading the following detailed description and claims and by referring to the accompanying drawings.

The above objects are attained in accordance wwith the present invention by the provision of a combination of elements which are fabricated in a manner substantially as described in the above abstract and summary.

BRIEF DESCRIPTION OF THE DRAWINGS

FIGS. 4 and 5 are perspective views of the rack apparatus disclosed in FIGS. 1-3, while being installed on a vehicle; and, FIGS. 6 and 7 are enlarged, broken, side elevational, part cross-sectional views of a unitary rack made in

DETAILED DESCRIPTION OF THE PREFERRED EMBODIMENTS

In the figures of the drawings, there is disclosed a unitary metal rack 10 for supporting various different objects therefrom, as for example coats, coat hangers having clothes thereon, hats, purses, umbrellas, shoes, ceiling wax and bags of cabbage.

Figure 1:
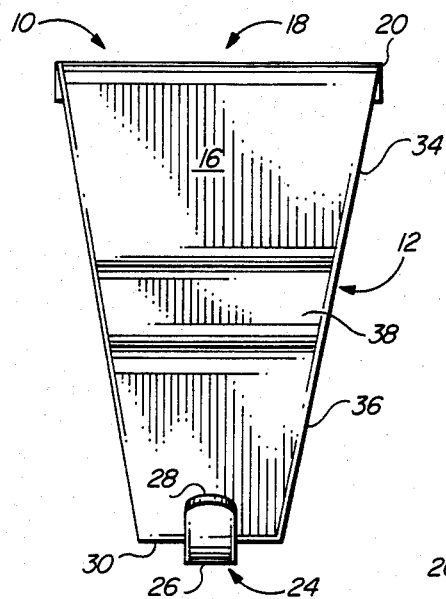
FIG. 1 is a front elevational view of a rack device made in accordance with the present invention.
Figure 2:
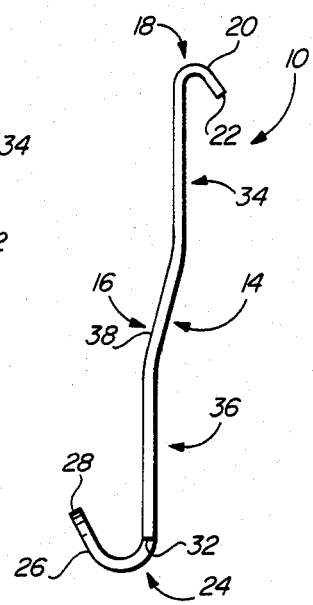
FIG. 2 is a side view of the rack apparatus of FIG. 1.
Figure 3:
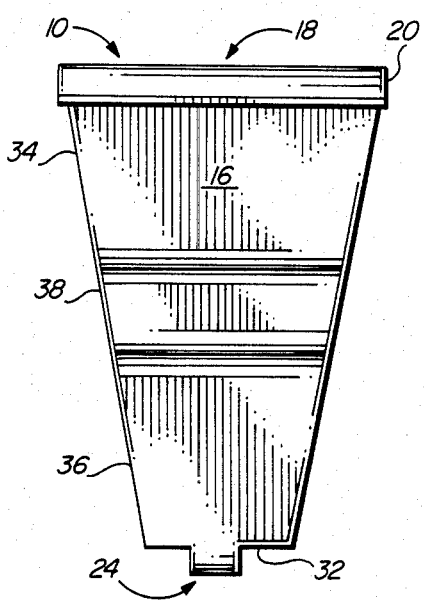
FIG. 3 is a rear elevational view of the rack disclosed in FIG. 1.

As seen in FIG. 2, along with other figures of the drawings, the rack includes a main body 12 having opposed back and front sides 14 and 16, and a top 18 which is bent into a lip 20 having a terminal end 22. The lip 20 forms a latch means in combination with a gasket and window glass or a gasket and window frame of a vehicle. The lower end 24 of the rack terminates in a hook 26 having a terminal end 28. The hook 26 is preferably formed by laterally reducing the width by cut-outs formed at 30 and 32.

The main body 12 is therefore bent into the latch 20 and hook 26 at the upper and lower opposed ends thereof. The main body is additionally bent into parallel planes 34 and 36 which are spaced from one another by a medial flat portion 38, thereby off-setting the latch means 20 from the hook means 26 an amount depending upon the length and angular disposition of the medial planar portion 38 respective to the marginal spaced planar portions 34 and 36.

Figure 6:
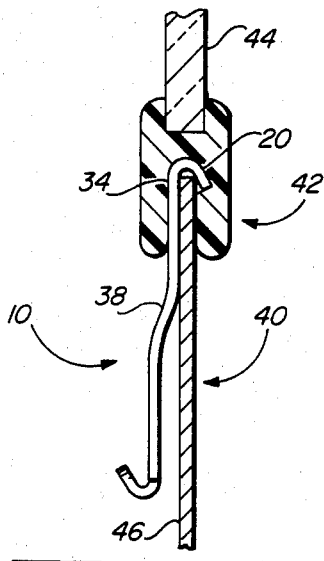

As seen in FIG. 6, the rack of the present invention can advantageously be used in combination with a metal window frame 40 having an upper marginal edge portion encapsulated by the spaced apart, downwardly extending legs of a resilient gasket 42, with there being a window glass 44 similarly positioned within the opposed upper channel of the resilient gasket 42. The rack of the present invention is inserted between the flat wall surface 46 of window frame 40 in underlying relationship respective to the inner wall surface of one of the u-shaped legs which forms the channel within the rubber gasket 42. The upper end 18 of the rack is pushed into abutting relationship respective to the innermost part of the groove of the gasket, whereupon lip 20 latches into place in the illustrated manner of FIGS. 6 or 7. The lip 20 is brought into latched relationship against the uppermost edge portion of the window frame, while a marginal area of the planar part 34 is urged to bear against the face 46 of the metal frame, thereby encapsulating and holding the upper marginal end of the rack with great force.

Figure 7:
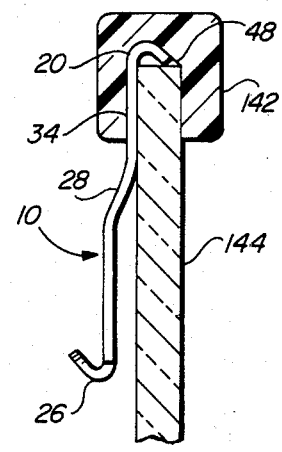

As seen in FIG. 7, the upper end 18 of the rack has been inserted under one of the legs of gasket 142 in the before described manner. Edge portion 22 of lip 20 bears against the upper longitudinally extending edge portion 48 of window glass 144, with the upper marginal length 34 of the rack providing a face which bears against a vertical face of the fixed glass 144.

Figure 4:
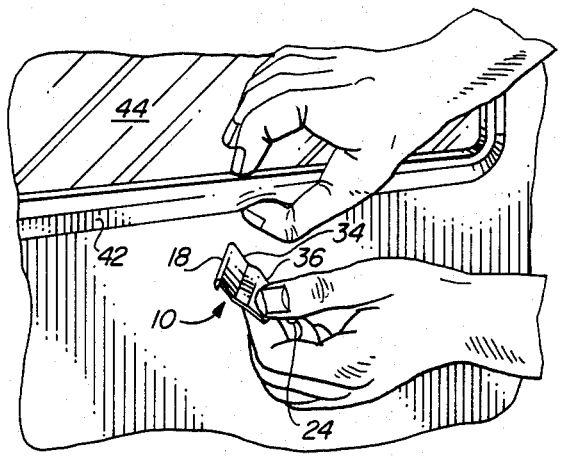
Figure 5:
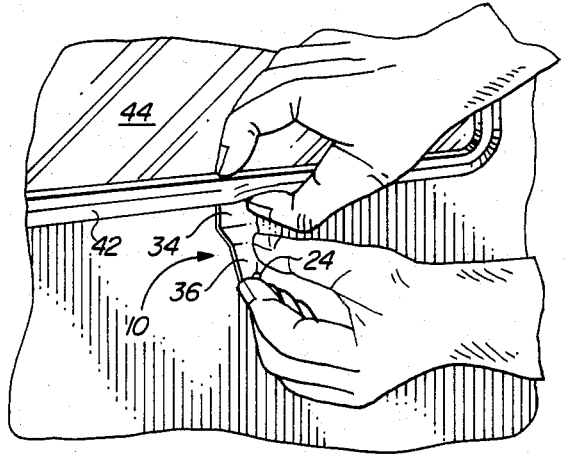

As seen in FIGS. 4 and 5, the rack of the present invention is easily installed under a leg of a gasket 42 by holding the lower marginal end 36 of the rack between the thumb and finger, and grasping the leg of the gasket 42 between a finger and thumb of the other hand, so that the upper end 18 of the rack can be forced between the window frame and the gasket. Thereafter, the rack is further urged up under the gasket leg until the lip 20 snaps over the center of the upper edge of the metal frame and into the position seen illustrated in either of FIGS. 6 or 7.

The low profile of the exhibited portion of the rack precludes inadvertent contact therewith by vehicle passengers. The offset which is formed between the upper and lower marginal ends of the rack conveniently extends the hook 26 away from the window so that it is readily engaged by the item to be supportedly attached thereto. The cooperative action between the upper lip together with the offset medial portion 36 enables the rack to be conveniently and removably affixed in all sorts of locations respective to a window frame and gasket, or to a window and gasket, of a modern vehicle. The rack provides an unexpectedly structurally sound means by which valuables may be temporarily stored out of the way at a location which otherwise could never be utilized in the absence of this invention. Moreover, the rack is easily removed from the window frame and gasket, and relocated as may be deemed desirable, by merely inserting a putty knife or other thin implement between the face 46 of window frame 40 and the rear side 14 of the upper marginal end 34 of the rack, and urging the rack upward until the lip thereof is urged free of the upper edge, which enables the rack to be slidably removed from sandwiched relationship respective to the gasket and the window frame.

The rack of the present invention is inexpensive, rugged in construction, and provides a convenient means by which a plurality of items can be placed throughout a vehicle, thereby advantageously utilizing dormant space.

I claim:

1. In a window frame having a gasket which encapsultes one marginal end therof, a glass having a marginal edge portion encapsulated within the gasket; the glass, gasket, and frame being fixed respective to one another, the combination with said window frame, glass, and gasket of a rack;

said rack includes a main body having a lip formed at the upper end thereof and a hook formed at the lower end thereof, said lip extends laterally from said main body in opposition to said hook, said hook is in the form of an upwardly opening curved configuration and is adapted to support articles which can be hung thereon;

said lip is bent into an acute angle respective to the main body, siad lip curves about and bears against an upper longitudinally extending edge portion of the window frame; and the lip, and adjacent marginal end portion of the rack is encapsulated within the gasket;

said main body, including said lip and hook, are of unitary construction.

2. The combination of claim 1 wherein said unitary body is made from a sheet of bent up metal, with there being a flat medial body portion which extends at a slight angle respective to an upper marginal and lower marginal body portion, so that the upper marginal body portion can lie in sandwiched relationship against an inner surface of the gasket and an outer surface of the window frame, while the lower marginal part of the main body is spaced from the metal frame and thereby extends the hook in spaced relationship respective to both the gasket and the window frame.

3. The combination of claim 1 wherein said hook is formed by a tab which is bent up into a curve in opposition to said lip;

said tab is formed by two opposed cut-outs which leaves the hook centrally located respective to the lower end of said main body.

4. A rack in combination with a fixed window frame, gasket, and glass; and rack is of unitary construction and is made from a bentup piece of metal, and can be inserted between the window gasket and the window frame to thereby removeably affix the rack respective to the window frame by the cooperative action of the gasket and the window frame;

said rack includes a lip formed at the upper end thereof and a hook formed at the lower end thereof, with said lip and hook laterally extending from a main body in oposition to one another;

said main body includes an upper marginal length spaced form a lower marginal length by a medial length of the main body; said medial length of the main body lies at an obtuse angle respective to the upper and lower marginal lengths thereof so that said hook is laterally spaced from said lip when the rack is operatively installed on the window frame;

said lip is curved into an acute angle respective to the main body and bears against an upper edge portion of a glass mounted in said window frame, with the upper marginal length of the main body bearing against the confronting faces of the gasket and the window glass;

said hook is adapted to receive articles which may be attached thereto.

5. The apparatus of claim 4 wherein said hook is formed by cut-outs leaving a centrally located tab wherein said tab is bent into a curve to thereby form an upwardly opening hook.

6. In a window frame having a lower frame member which terminates in a horizontally disposed edge portion, with there being a resilient gasket having a groove within which the upper marginal edge of the window frame is received, the combination with said window frame and gasket of a rack;

said rack includes an upper, medial, and lower marginal area, a lip for engaging the frame formed at the upper end of said upper marginal area; a hook for engaging objects which are supported by the rack, said hook is formed at the lower end of said lower marginal area;

said lip and hook are arranged on opposite sides of their respective marginal area; said upper and said lower marginal area lie in a plane which describes an obtuse angle respective to said medial area; said upper and said lower area are substantially parallel to one another.

7. The combination of claim 6 wherein said hook is formed by cut-outs leaving a centrally located tab wherein said tab is bent into a curve to thereby form an upwardly opening hook.

8. The combination of claim 6 wherein said lip is bent into an acute angle respective to the remaining main body portion, so that the terminal edge portion of said lip bears against an upper longitudinally extending edge portion of the window frame.

9. The combination of claim 6 wherein said hook is formed by a tab which is bent into a curve in opposition to said lip;

said tab is formed by two opposed cut-outs which leaves the hook centrally located respective to the lower end of said main body.

10. The combination of claim 6 wherein said hook is formed by a tab which is bent into a curve in opposition to said lip;

said tab is formed by two opposed cut-outs which leaves the hook centrally located respective to the lower end of said main body;

said lip is bent into an acute angle respective to the remaining main body portion, so that the terminal edge portion of said lip bears against an upper longitudinally extending edge portion of the window frame.

* * * * *

UNITED STATES PATENT AND TRADEMARK OFFICE
CERTIFICATE OF CORRECTION

PATENT NO. : 4,495,735
DATED : JANUARY 29, 1985
INVENTOR(S) : JOHNNY C. ELKINS

It is certified that error appears in the above—identified patent and that said Letters Patent is hereby corrected as shown below:

Column 2, line 52, correct the spelling of "with";

Column 5, line 2, substitute --said-- for "and" before rack;

Line 13, substitute --from-- for "form".

Signed and Sealed this

Second Day of July 1985

[SEAL]

Attest:

DONALD J. QUIGG

Attesting Officer    Acting Commissioner of Patents and Trademarks